US010114221B1

(12) United States Patent
Evans, V (10) Patent No.: US 10,114,221 B1
(45) Date of Patent: Oct. 30, 2018

(54) TOGGLING A 360-DEGREE CAMERA TO SELFIE VIEW

(71) Applicant: Essential Products, Inc., Palo Alto, CA (US)

(72) Inventor: David John Evans, V, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/724,161

(22) Filed: Oct. 3, 2017

Related U.S. Application Data

(60) Provisional application No. 62/528,357, filed on Jul. 3, 2017.

(51) Int. Cl.
| | |
|---|---|
| *H04M 1/02* | (2006.01) |
| *H04M 1/725* | (2006.01) |
| *G02B 27/01* | (2006.01) |
| *G06F 3/0481* | (2013.01) |
| *H04N 7/18* | (2006.01) |
| *H04N 1/00* | (2006.01) |
| *H04N 7/14* | (2006.01) |
| *G03B 17/00* | (2006.01) |
| *G03B 37/00* | (2006.01) |
| *G02B 13/06* | (2006.01) |
| *G03B 37/04* | (2006.01) |
| *G06F 1/16* | (2006.01) |

(52) U.S. Cl.
CPC ..... *G02B 27/0172* (2013.01); *G02B 27/0179* (2013.01); *G06F 3/04815* (2013.01); *G02B 13/06* (2013.01); *G02B 27/017* (2013.01); *G02B 2027/0187* (2013.01); *G03B 17/00* (2013.01); *G03B 37/00* (2013.01); *G03B 37/04* (2013.01); *G06F 1/1686* (2013.01); *H04M 1/0264* (2013.01); *H04M 2250/52* (2013.01); *H04N 1/00307* (2013.01); *H04N 7/185* (2013.01); *H04N 2007/145* (2013.01)

(58) Field of Classification Search
CPC .. G02B 13/06; G02B 27/017; G02B 27/0172; G02B 27/0179; G02B 2027/0138; G02B 2027/0187; G03B 17/00; G03B 37/00; G03B 37/04; G06F 1/1686; G06F 3/04815; H04M 1/0264; H04M 2250/52; H04N 1/00307; H04N 7/185; H04N 2007/145
See application file for complete search history.

(56) References Cited

U.S. PATENT DOCUMENTS

| | | | |
|---|---|---|---|
| 9,554,041 B1* | 1/2017 | Shin | H04N 5/23238 |
| 2004/0041911 A1* | 3/2004 | Odagiri | G06F 1/1632 |
| | | | 348/207.1 |
| 2016/0098138 A1* | 4/2016 | Park | G06F 3/0416 |
| | | | 345/173 |
| 2016/0219217 A1* | 7/2016 | Williams | H04N 5/23293 |
| 2017/0006340 A1* | 1/2017 | Enke | H04N 21/440281 |
| 2017/0244934 A1* | 8/2017 | Chien | H04N 7/181 |

* cited by examiner

*Primary Examiner* — Michael J Eurice
(74) *Attorney, Agent, or Firm* — Perkins Coie LLP (57) ABSTRACT

The disclosed embodiments include a method performed by a handheld mobile device (HMD). The method can include enabling the HMD to capture one or more views spanning 360-degrees including a view facing a user of the HMD, receiving an input by the HMD to view an image of a view of the views spanning 360-degrees, and responsive to another input, toggling from any image of any view of the views spanning 360-degrees to an image of the view facing the user of the HMD.

20 Claims, 8 Drawing Sheets

TOGGLING A 360-DEGREE CAMERA TO SELFIE VIEW

CROSS-REFERENCE TO RELATED APPLICATION

This application claims the benefit of commonly assigned U.S. Provisional Patent Application Ser. No. 62/528,357, filed on Jul. 3, 2017, and entitled "Technologies for Handheld Devices," the disclosure of which is hereby incorporated herein in its entirety by reference.

TECHNICAL FIELD

The disclosed teachings generally relate to a technique for toggling a wide field-of-view camera to a default view. The teachings more particularly relate to a button for toggling a 360-degree camera accessory mounted on a smartphone to a selfie view.

BACKGROUND

A handheld mobile device (HMD) is a small computing device such as a smartphone or wearable electronic device. A typical HMD includes circuitry and other components configured to access wireless networks and communicate with other computing devices. A typical HMD is a mobile personal computer with a mobile operating system with features useful for mobile or handheld use. Smartphones, which are typically pocket-sized (as opposed to tablets, which are relatively larger), have the ability to place and receive voice/video calls and create and receive text messages, play media, enable GPS navigation, and include digital cameras for capturing images and video.

For example, a smartphone can include a front-facing camera, a rear-facing camera, or both. A front-facing camera, or selfie camera, allows taking a self-portrait photograph or video while looking at the display of the smartphone. In contrast, a rear-facing camera has its lens facing away from the user, like a regular digital camera. The user can switch between front- and rear-facing views. The functionality of a camera can be extended with software that allows for capturing a panoramic image by stitching together images captured by physically aiming and sweeping the camera across an area.

A smartphone can enable users to add a separate functionality or improve an existing functionality by adding an accessory. For example, a separate camera accessory can easily be coupled to a smartphone via a wired interface (e.g., universal serial bus (USB) connection) or wireless interface (e.g., Wi-Fi, BLUETOOTH, SIBEAM connector). As such, the smartphone can control operations of the camera accessory. The user can typically control the operations of the camera via a graphical user interface (GUI) on a touch-sensitive display screen of the smartphone. The added functionality of a separate camera accessory can include views spanning 360-degrees by using wide-angle lenses. Although a 360-degree camera accessory enables capturing images that cannot be captured using conventional cameras of smartphones, users lack the ability to fully and effectively take advantage of the functionality of the 360-degree camera accessory.

SUMMARY

The disclosed embodiments include a method performed by a handheld mobile device (HMD). The method can include enabling the HMD to capture a 360-degree image and separate views spanning 360-degrees including views facing a user of the HMD and views facing away from the user, where each view is a portion of the 360-degree image. The method can include receiving, by the HMD, a first input to set a current view of the HMD to a particular view facing away from the user. Responsive to the first input, the current view of the HMD is set to the particular view facing away from the user. The method can further include, receiving, by the HMD, a second input to set the current view of the HMD to a particular view of the views facing the user. Responsive to the second input, a return view of the HMD is set to the particular view facing away from the user, and changing the current view of the HMD to the particular view facing the user. The method can further include receiving, by the HMD, a third input to return the changed current view of the HMD back to the return view. Responsive to the third input, the changed current view of the HMD is returned back to the return view.

In some embodiments, the HMD is a camera accessory coupled to a smartphone. In some embodiments, the smartphone is configured to selectably display each of the 360-degree image and a view of the 360-degree image. In some embodiments, each input is an input by the user to the smartphone. In some embodiments, each input is a touch input on a single graphical icon displayed on a touch-sensitive display of the smartphone. In some embodiments, each input is received by a single physical button of the smartphone.

The disclosed embodiments also include a handheld mobile device (HMD) that can include camera modules enabled to capture a 360-degree image and views spanning 360-degrees including a view facing a user of the HMD, where each view is a portion of the 360-degree image. The HMD can include sensors of the camera modules configured to, responsive to an input, toggle the HMD from any view of the views spanning 360-degrees to the view facing the user of the HMD and, responsive to another input, switch the HMD to a return view facing away from the user.

In some embodiments, the return view is a dynamic view corresponding to a last view before the HMD was toggled to the view facing the user. In some embodiments, the return view is a static view preset before the HMD was toggled to the view facing the user. In some embodiments, the HMD is configured to enable capturing a video continuously across any of the views spanning the 360-degrees including while toggling to the view facing the user.

The disclosed embodiments also include an image capture system including a smartphone coupled to a camera accessory. The smartphone can include a touch-sensitive display screen, and an interface configured to wirelessly couple the smartphone to an accessory while mounted to the smartphone. The camera accessory can include camera modules enabled to capture a 360-degree image and views spanning 360-degrees including a view facing a user of the system, where each view is a portion of the 360-degree image. The sensors of the camera modules are configured to, responsive to an input by the user on the smartphone, toggle the system from displaying any image of the plurality of views spanning 360-degrees to displaying an image of the view facing the user of the system and, responsive to another input by the user on the smartphone, switch the system to displaying a return view of the system.

In some embodiments, the return view is a last view before the HMD was toggled to the view facing the user. In some embodiments, the return view is a view preset before the HMD was toggled to the view facing the user.

In some embodiments, the other input comprises an event associated with capturing a preset number of images of the user or capturing images of the user for a preset duration. In some embodiments, the other input comprises expiration of a timer that started when the system was toggled to the view facing the user.

In some embodiments, each input is a touch input on a single graphical icon displayed on the touch-sensitive display screen of the smartphone. In some embodiments, each input is received by a single physical button of the smartphone.

In some embodiments, the system is configured to capture a 360-degree video. In some embodiments, the view facing the user is identified via facial recognition of the user's face. In some embodiments, the touch-sensitive display is configured to selectably display each of the 360-degree image and a view of the 360-degree image.

The disclosed embodiments include a method performed by an image capture system including camera sensors configured to capture a 360-degree image. The method can include using the camera sensors to capture a 360-degree image, and selectably displaying either the 360-degree image and a selected portion of the 360-degree image.

In some embodiments, each selection is made via a touch input on a touch-sensitive display of the system. In some embodiments, each selection is made via a physical button of the system.

In some embodiments, the camera sensors are configured to capture a 360-degree video, and the method further includes selectably displaying each of either a 360-degree video and a selected portion of the 360-degree video.

This Summary is provided to introduce a selection of concepts in a simplified form that is further described below in the Detailed Description. This Summary is not intended to identify key features or essential features of the described subject matter, nor is it intended to be used to limit the scope of the claimed subject matter. Other aspects of the technique will be apparent from the accompanying Figures and Detailed Description.

DETAILED DESCRIPTION

The embodiments set forth below represent the necessary information to enable those skilled in the art to practice the embodiments and illustrate the best mode of practicing these embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

A handheld mobile device (HMD) is a computing device that can be readily carried or worn by a user. Examples include smartphones (e.g., APPLE IPHONE, SAMSUNG GALAXY, NOKIA LUMINA), tablet computers (e.g., APPLE IPAD, SAMSUNG NOTE, AMAZON FIRE, MICROSOFT SURFACE), wireless devices capable of machine-to-machine communication, wearable electronic devices, and any other computing device that is capable of accessing networks such as a cellular network and/or Internet. The accessories of HMDs are themselves HMDs. Examples include a camera accessory, battery, or speaker that can be coupled to an HMD such as a smartphone. An HMD such as a smartphone is not referred to as an accessory because it is a standalone device. On the other hand, an accessory typically extends the functionality of another HMD and is not a standalone device. For example, a camera accessory adds camera functionality to a smartphone when coupled together.

An HMD includes hardware such as a processor coupled to components such as non-transitory machine-readable media (e.g., machine-readable storage media such as magnetic disks, optical disks, read-only memory (ROM), flash memory devices, and phase change memory), flash memory devices, and phase change memory) and transitory machine-readable transmission media (e.g., electrical, optical, acoustical, or other forms of propagated signals, such as carrier waves or infrared signals) to store code and/or data, user input/output (I/O) devices (e.g., a keyboard, a touchscreen, and/or a display), and network connections (e.g., an antenna) to transmit code and/or data using propagating signals. The coupling of the processor to the components is typically through busses or bridges (also referred to as bus controllers). Thus, a non-transitory machine-readable medium of a given device typically stores instructions for execution on processor(s) of that device. The parts of an embodiment of the present disclosure may be implemented using different combinations of software, firmware, and/or hardware.

Figure 1A:
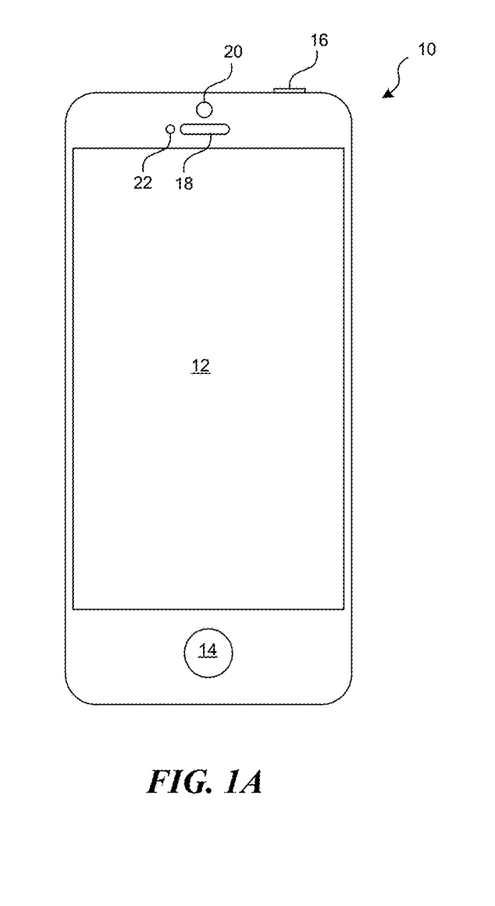
FIG. 1A illustrates a front view of a smartphone according to some embodiments of the present disclosure.
Figure 1B:
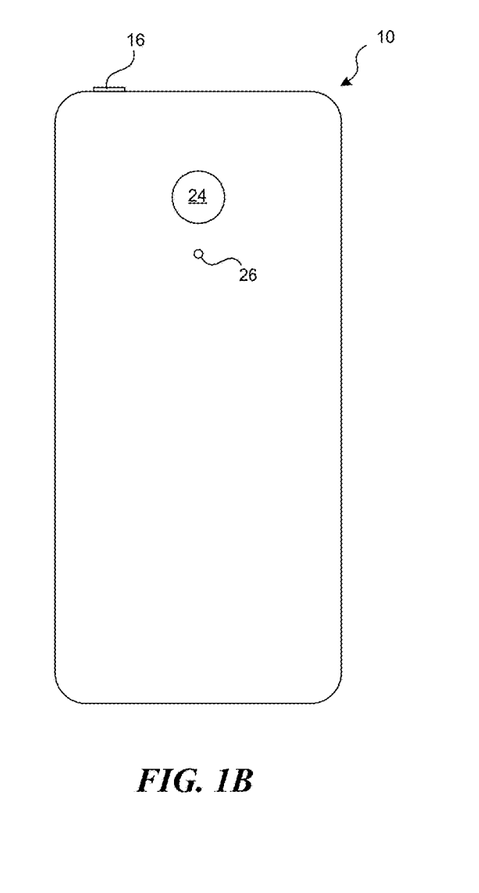
FIG. 1B illustrates a rear view of the smartphone of FIG. 1A according to some embodiments of the present disclosure.

For example, FIGS. 1A and 1B illustrate different views of a smartphone 10 according to some embodiments of the present disclosure. In particular, FIG. 1A illustrates a front view of the smartphone 10. As shown, the smartphone 10 includes a display screen 12. The display screen 12 may be a touch-sensitive display screen that receives touch inputs from users and presents images as outputs. The smartphone 10 also includes a button 14 on the lower front face of the smartphone 10 and another button 16 on the upper edge of the smartphone 10. The button 14 may, for example, be actuated to navigate a menu of items or images displayed on the display 12. The button 14 may also include a fingerprint scanner to identify a user and/or unlock the smartphone 10. The button 16 may be actuated to turn the smartphone 10 on/off, for example.

The smartphone 10 also includes a speaker 18. The speaker 18 is disposed on the front face of the smartphone 10 such that a user can hear audio from an ongoing call when the smartphone 10 is operating to conduct a telephone call. The smartphone 10 includes a front-facing camera 20 and a flash 22 that can illuminate an area in the field-of-view (FOV) of the front-facing camera 20. The front-facing camera 20 can capture (e.g., input, render, record) still images or video images displayed on the display 12. In particular, the display 12 can display images in the front-facing camera 20's FOV and, for example, a user can tap a virtual button displayed on the display 12 or a physical button (14, 16) to capture a still image or video images being displayed.

FIG. 1B illustrates a rear view of the smartphone 10. As shown, the smartphone 10 includes a rear-facing camera 24 and flash 26. The rear-facing camera 24 may be similar to the front-facing camera 20 but faces an opposite direction (180 degree difference). A user aiming the rear of the smartphone 10 towards an object within the FOV of the rear-facing camera 24 can view an image of that object on the display 12 and, for example, tap a virtual button displayed on the display 12 or click the button 14 or 16 to capture a still image or video images being displayed. The smartphone 10 may include fewer components or other components not shown herein for the sake of brevity but known to persons skilled in the art.

Figure 2:
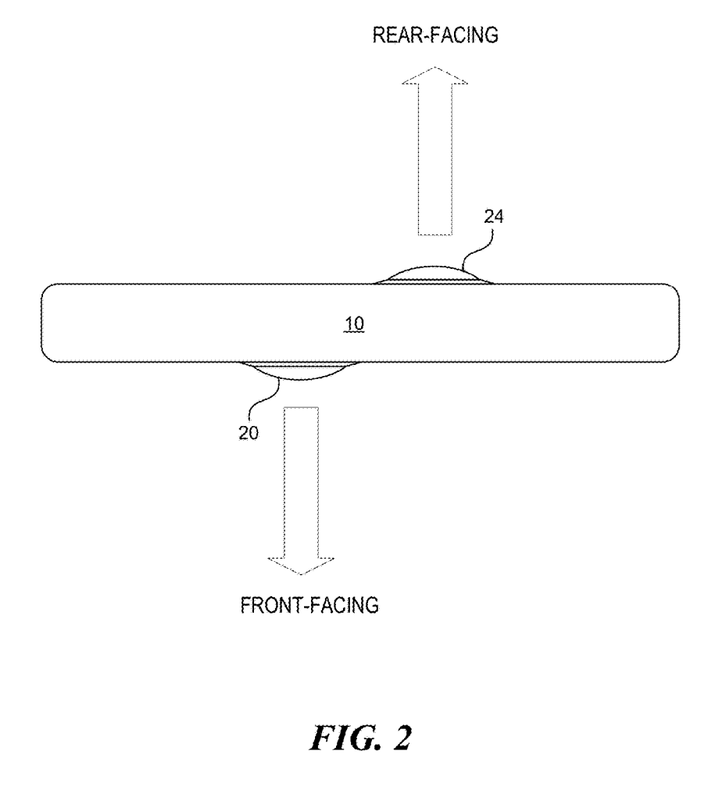
FIG. 2 illustrates the relative locations of a rear-facing camera and a front-facing camera of the smartphone of FIG. 1A according to some embodiments of the present disclosure.

FIG. 2 illustrates the relative positions of the rear-facing camera 24 and the front-facing camera 20 of the smartphone 10 according to some embodiments of the present disclosure. The front-facing camera 20 (commonly called a "selfie" camera) allows a user operating the smartphone 10 to take self-portrait images while facing the display 12 of the smartphone 10. In contrast, the rear-facing camera 24 has its lens facing away from the user, like a regular digital camera. Thus, the smartphone 10 has two views, the front-facing view of the front-facing camera 20 and the rear-facing view of the rear-facing camera 24. A user can only switch the smartphone 10 between the front-facing view of the front-facing camera 20 and a rear-facing view of the front-facing camera 24. To capture any other view, the user must set the smartphone 10 to the rear-facing view or the front-facing view and physically aim the corresponding camera 24 or 20, respectively, in the desired view. For example, to capture a panoramic view of a scene, a user can set the smartphone to the rear-facing view and aim the rear-facing camera 24 along a path that spans the panorama.

The smartphone 10 may have the rear-facing view or the front-facing view set by default. For example, a user may interact with a graphical user interface (GUI) of a software application ("app") running on the smartphone 10 to set the rear-facing camera 24 or front-facing camera 20 as the active view displayed on the display 12. The smartphone 10 can remain in that view until the user switches the smartphone 10 between the rear-facing camera 24 or the front-facing camera 20. For example, the GUI may include a virtual button that can be triggered to switch between the rear-facing camera 24 and the front-facing camera 20. Accordingly, the user can set the camera to a selfie view to activate the front-facing camera 20 by clicking on the virtual button.

Figure 3A:
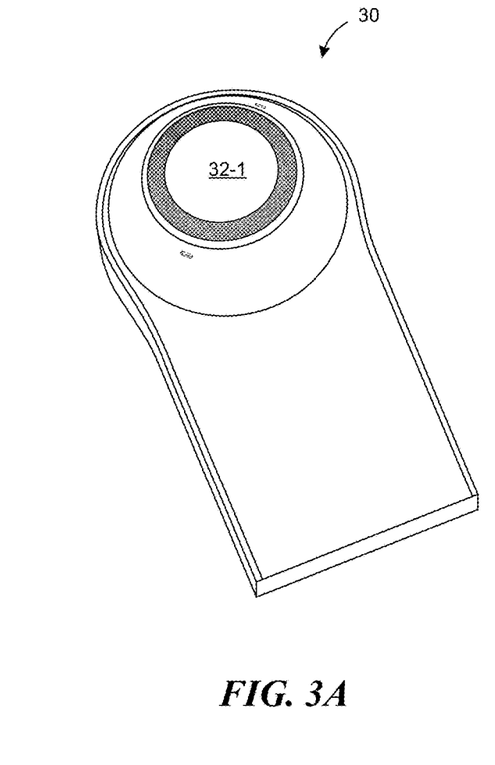
FIG. 3A illustrates a perspective view of a 360-degree camera accessory according to some embodiments of the present disclosure.
Figure 3B:
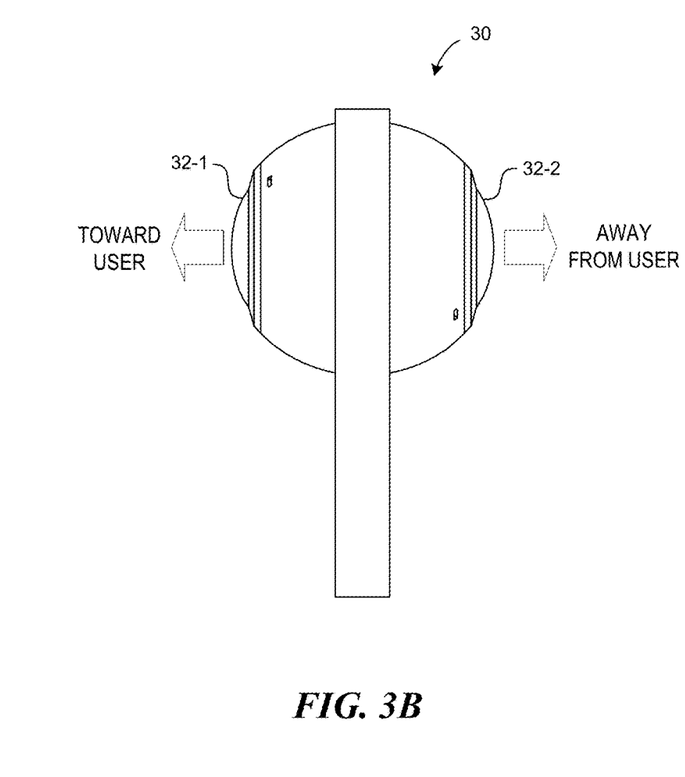
FIG. 3B illustrates a side view of the 360-degree camera accessory of FIG. 3A according to some embodiments of the present disclosure.

In some embodiments, the smartphone 10 is configured to enable replacing or extending the functionality of the cameras 20 and/or 24 by coupling a camera accessory to the smartphone 10. For example, a camera accessory can be coupled to the smartphone 10 via wireless gigabit connectors (e.g., SIBEAM connectors) on each of the smartphone 10 and the camera accessory. The added functionality of a camera accessory can include a 360-degree image capture function by using a combination of wide angle lenses. For example, FIGS. 3A and 3B illustrate views of a 360-degree camera accessory 30 according to some embodiments of the present disclosure. In particular, FIG. 3A illustrates a perspective view of the 360-degree camera accessory 30, and FIG. 3B illustrates a side view of the 360-degree camera 30.

The 360-degree camera accessory 30 is an imaging device configured to capture a wide FOV of a scene. The 360-degree camera accessory 30 can include any number of camera modules including respective lenses disposed on a surface of the 360-degree camera accessory 30. As shown, the 360-degree camera accessory 30 includes two camera modules with respective lenses 32-1 and 32-2. The lens of camera 32-1 faces a first direction, and the lens 32-2 of the second camera faces a second direction, opposite of the first direction.

The camera lenses 32-1 and 32-2 collectively receive light from a wide-angle view to capture a 360-degree image of a 360-degree view. The curved three-dimensional surface of the 360-degree camera accessory 30 can take on any shape, such as an ellipsoid, a spheroid, a sphere, a cube with rounded edges, or any three-dimensional shape. The camera lenses 32-1 and 13-2 (also collectively referred to as camera lenses 32) can be disposed on the 360-degree camera accessory 30 in a variety of ways. As shown, the camera lens 32-1 can face towards a user and the camera lens 32-2 can face the opposite direction away from the user. In some embodiments, camera lenses can be uniformly distributed on the curved three-dimensional surface, placed at the intersection of uniformly distributed longitude and latitude lines, can be more densely distributed in some areas such as a front-facing region and/or the rear-facing region, or the like.

The 360-degree camera accessory 30 can include several electronic, mechanical, or optical components exposed to an external environment and well known to persons skilled in the art but not shown or described herein for the sake of brevity. For example, the 360-degree camera accessory 30 can include an illumination device such as a flash. The 360-degree camera accessory 30 also includes various internal components and circuitry not shown in FIGS. 3A and 3B. Further, the disclosed technology is applicable to any camera having a wide FOV that can be less than 360-degrees.

Figure 4:
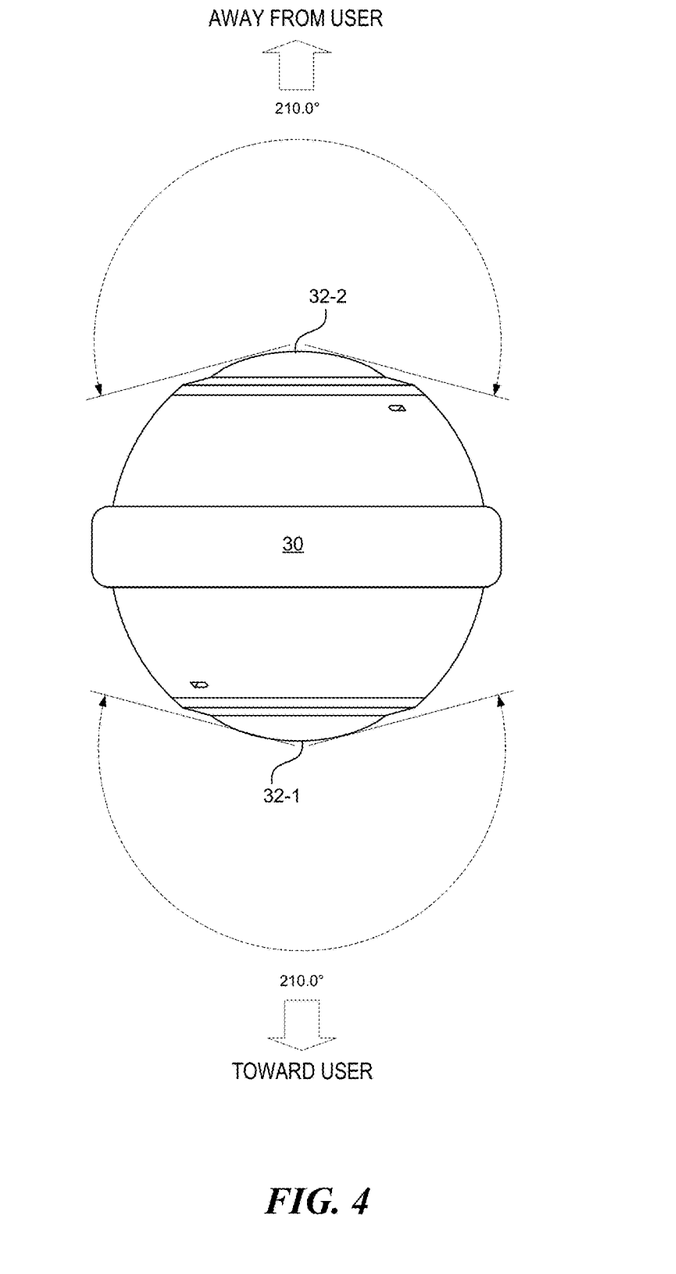
FIG. 4 illustrates a top view of the 360-degree camera accessory of FIG. 3A according to some embodiments of the present disclosure.

FIG. 4 illustrates a top view of the 360-degree camera accessory 30. The top view illustrates that each camera lens 32-1 and 32-2 of respective camera modules have a wide FOV. In the illustrated example, each camera lens 32-1 and 32-2 has a FOV of 210 degrees. Accordingly, the combination of the camera lenses 32-1 and 32-2 can collectively have a 360-degree FOV. The 360-degree camera accessory 30 can pan to any of 360-degree views (e.g., a portion of a 360-degree image) without a user needing to physically aim the 360-degree camera accessory 30 in any direction. For example, when coupled to the smartphone 10, the user can navigate the view being displayed on display 12 via controls of the smartphone 10. For example, a GUI of the smartphone 10 may include controls that can be manipulated by the user to navigate the view of 360-degree camera accessory 30 in any direction including facing towards the user to capture a selfie image.

Figure 5:
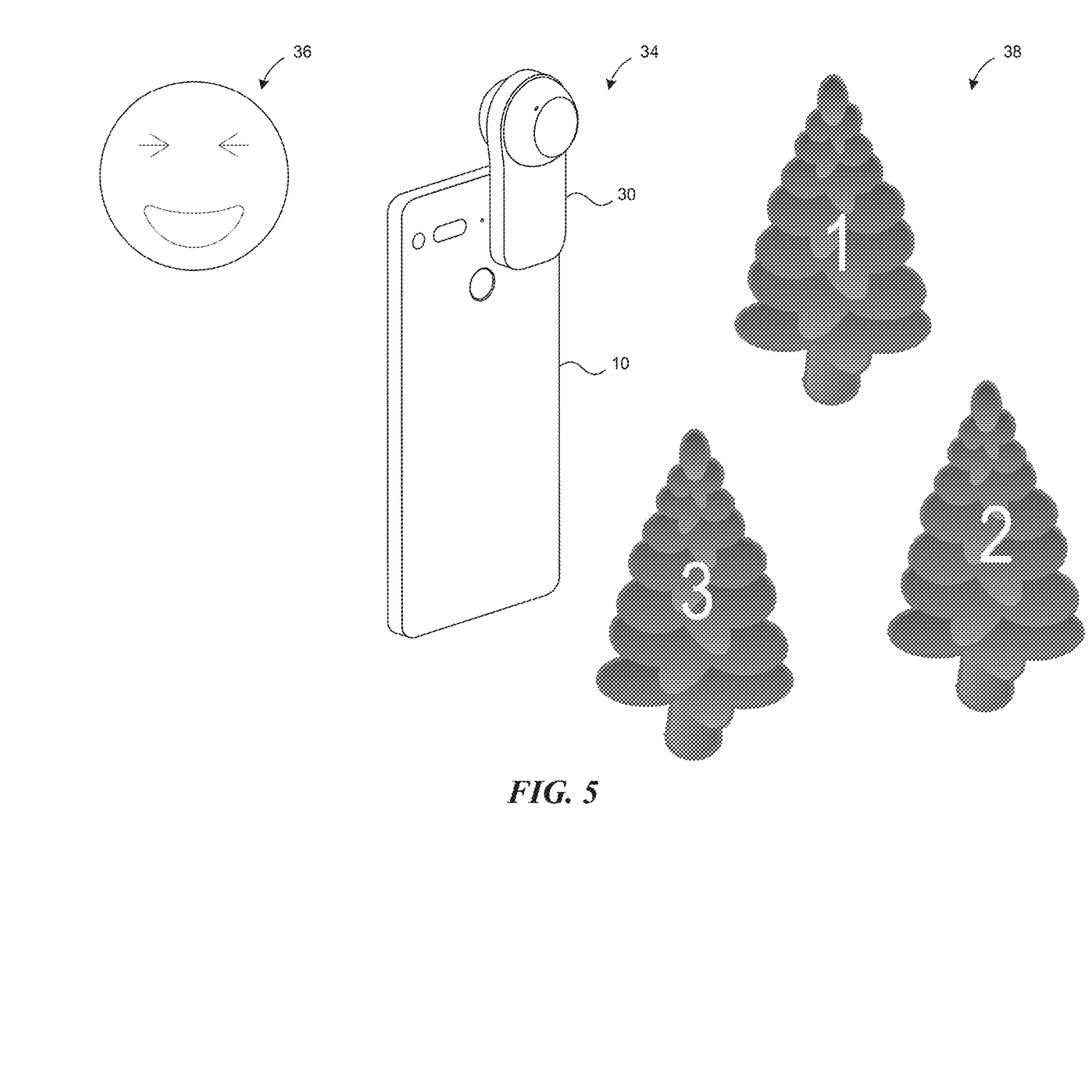
FIG. 5 illustrates an image capture system including a 360-degree camera accessory mounted to a smartphone collectively configured to capture images of multiple views according to some embodiments of the present disclosure.

FIG. 5 illustrates an image capture system 34 including the 360-degree camera accessory 30 mounted to the smartphone 10 collectively enabled to capture images of multiple views spanning 360-degrees according to some embodiments of the present disclosure. The 360-degree camera accessory 30 can be coupled to the smartphone 10 via wireless gigabit connectors (or any other connectors) on each of the camera accessory 30 and smartphone 10. The image capture system 34 is enabled to capture multiple images spanning 360-degrees including a view of the user 36 on a front-facing side of the smartphone 10. The image capture system 34 is also enabled to capture images of multiple views including objects in other locations such as the three objects 38 distributed at different locations relative to the image capture system 34.

The user 36 can operate the 360-degree camera accessory 30 via an interface (not shown) of the smartphone 10. For example, the interface may be a GUI that can receive user inputs including gestures such as a tap, drag, swipe, and pinch. For example, the user 36 can drag a control on the GUI to pan from a selfie view to different views including objects 38-1, 38-2, and 38-3. The GUI may include another control that can be tapped by the user 36 to cause the smartphone 10 to capture an image or video images of a current view of the 360-degree camera accessory 30. In some embodiments, the GUI may include a control that allows the user 36 to pan the 360-degree camera accessory 30 from facing the user 36 (e.g., selfie view) to facing away from the user 36 in any other direction. Although the added functionality of a 360-degree camera 30 enables users to capture more views compared to the cameras 20 and 24 of the smartphone 10 alone, users still lack the ability to effectively take advantage of this added functionality.

In particular, the 360-degree camera accessory 30 is not inherently anchored to any particular view because it is configured to capture any of 360-degrees of views without needing to physically aim the smartphone 10 in any direction. This presents a problem in that a user can pan the 360-degree camera accessory 30 to any view, and the camera remains in that view until the user pans the camera accessory to another view. This creates a cognitive burden on the user to determine the orientation of a current view of the 360-degree camera accessory 30 before the user can navigate to another view. For example, the user 36 may capture an image of a view including the object 38-1 without needing to physically aim the image capture system 34 at the object 38-1. If the user physically changes the orientation of the image capture system 34 or uses the phone for any other function and then returns to using the camera function of the smartphone 10, the user must determine the orientation of the previous view to pan the 360-degree camera accessory 30 to another view including the objects 38-2 or 38-3 or capture a selfie view.

The disclosed embodiments overcome these drawbacks by enabling a default view of the 360-degree views of the 360-degree camera accessory 30. For example, the 360-degree camera accessory 30 may have a default view corresponding to the front-facing view (i.e., selfie view) of the front-facing camera 20 or rear-facing view of the rear-facing camera 24 of the smartphone 10. The image capture system 34 may include a virtual button or physical button that can switch from any current view to the default view when toggled. In some embodiments, the button is configured to toggle the camera accessory 30 to a selfie view. This "selfie button" may be a physical button on the camera accessory or the smartphone 10, or a virtual control displayed on the GUI of the smartphone 10 on which the 360-degree camera accessory 30 is coupled.

The selfie button can toggle a camera from non-selfie mode to selfie mode, and back to non-selfie mode. In other words, the image capture system 34 can go between a view pointing away from a user to a view pointing toward the user.

The selfie button can be used with the 360-degree camera accessory 30 or cameras 20 or 24 of the smartphone 10 of the image capture system 34. Upon clicking the selfie button while in a non-selfie mode, a command is issued to toggle the 360-degree camera accessory 30 to a selfie mode. Upon clicking the button while in selfie mode, a command is issued to toggle the 360-degree camera accessory 30 back to the non-selfie mode from which the camera was toggled to selfie mode. In other words, a user can click a button to change the perspective of a camera to a selfie view from any other view, and then click the button to return back to the other view.

For example, when operating the image capture system 34, the user 36 can control the FOV and direction of a video being recorded by using swipe gestures on the touch-sensitive display 12 of the smartphone 10. Therefore, the user 34 can see any portion of the entire perspective of the 360-degree camera accessory 30. The user 36 can thus reset the start-point of the image capture system 34 to selfie mode such that the user 36 can maintain a sense of selfie mode as the natural orientation of the image capture system 34. As a result, if the user 36 is going to capture a video that includes the user 36, the user can quickly determine the state of the user's appearance while conducting an image capture spanning any 360-degree views.

In some embodiments, the image capture system 34 has a setup mode for a user to set one or more default modes corresponding to different directions of the 360-degree camera accessory relative to the user 36. For example, the user 36 can set a rear-facing view 180-degrees from the user 36 as the default mode to toggled a view of the image capture device 34 by clicking on a button. When the user 36 has the user's finger on the display screen 12, the user can use touch to scroll and pan anywhere the user wants, and click on a button to reset the view between specified modes.

Having a button that allows a user to toggle from any orientation to a selfie mode is an advantageous feature for 360-degree cameras because they lack any naturally defined anchor view unlike rear-facing or front-facing cameras of smartphones. Thus, a 360-degree camera could be oriented in selfie mode by default. This facilitates certain forms of capturing images such as when a user narrates recordings. For example, a user snowboarding is probably not looking at herself. The user may want to capture views of a mountain and switch to selfie mode to dynamically view herself and/or provide narration of the images being captured.

Figure 6:
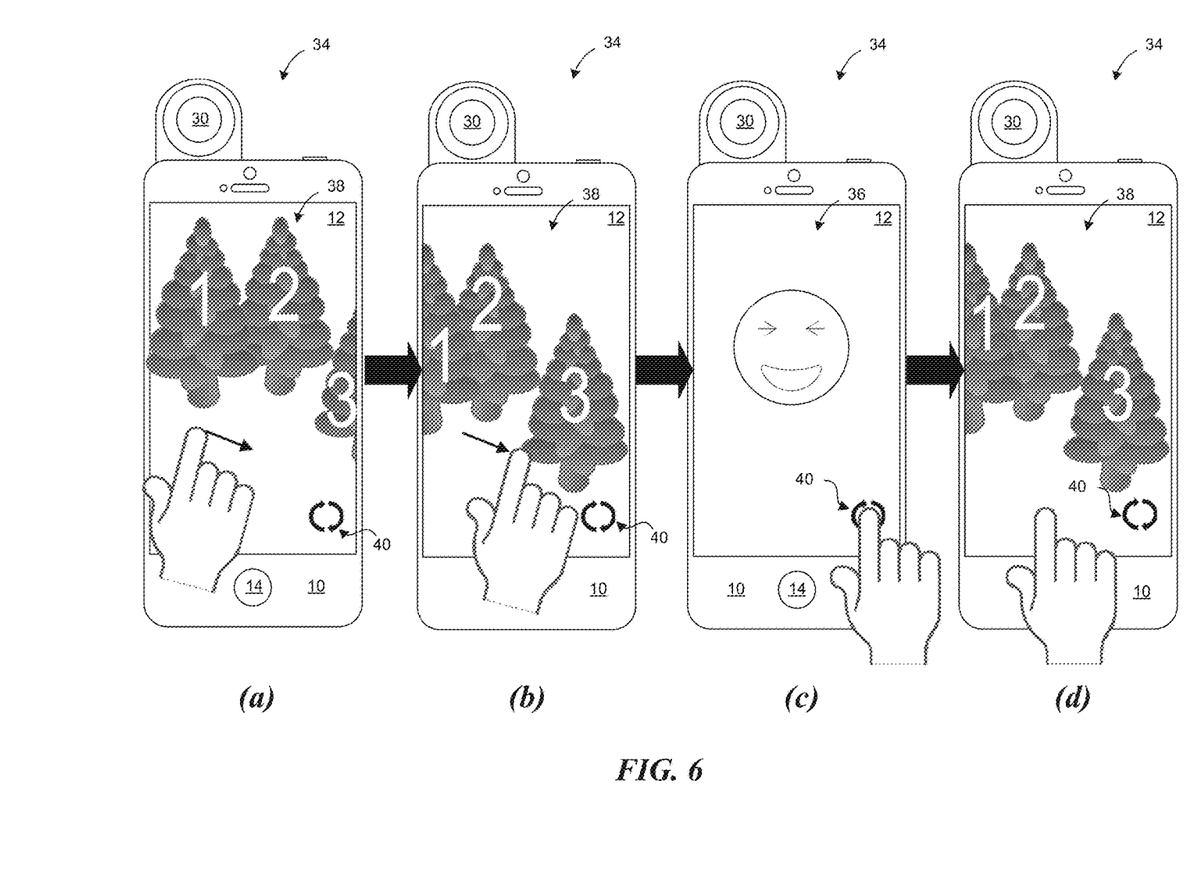
FIG. 6 illustrates a sequence of figures as steps performed by the image capture system of FIG. 5 to toggle to a selfie view according to some embodiments of the present disclosure.

FIG. 6 illustrates a sequence of steps in FIGS. 6(a)-(d) performed by the image capture system 34, including the 360-degree camera accessory 30 mounted to the smartphone 10, to toggle to a selfie view according to some embodiments of the present disclosure.

In FIG. 6(a), the display 12 of the smartphone 10 displays the objects 38 in the current view of the 360-degree camera accessory 30. The user 36 can pan from the current view of the 360-degree camera accessory 30 by performing a drag gesture as shown in FIG. 6(a) to view less of the object 38-1 and more of the object 38-3. The display screen 12 also includes a virtual selfie button 40. In some embodiments, the selfie button is a physical button of the smartphone 10 such as the button 14, which can be actuated while the smartphone 10 is in an image capture mode to cause the 360-degree camera accessory 30 to switch to a selfie view.

In FIG. 6(b), the display 12 of the smartphone 10 displays the next view of the 360-degree camera accessory 30 after being panned in a direction relative to the swipe gesture as shown. As a result, the entire object 38-3 is in the next view displayed on the display 12 and less of the object 38-1 is in the next view of the 360-degree camera accessory 30. The user 36 can pan the 360-degree camera accessory 30 in any direction spanning the 360-degree views. The GUI of the smartphone 10 may enable other functions such as pinch-to-zoom, tap-to-focus, or the like to dynamically change the current view, which are well known to persons skilled in the art and not described herein for the sake of brevity.

In FIG. 6(c), the user 36 taps the selfie button 40 to switch to the selfie view from any other view of the 360-degree camera accessory 30. In some embodiments, the selfie view is a single preset view such as, for example, a view corresponding to the front-facing view of the front-facing camera 20. In some embodiments, the selfie view is dynamic. For example, the selfie view can be determined dynamically by using facial recognition technology to identify the face of a user holding the image capture system 34. The selfie view would thus correspond to a view that includes the user's recognized face. In some embodiments, the selfie button 40 can change or animate when the user 36 enters the selfie view or switches back to another view. By changing or animating the selfie button 40, the user can quickly determine the current view or mode of the 360-degree camera accessory 30.

In FIG. 6(d), the 360-degree camera accessory 30 switches back to a prior view of FIG. 6(b) after the user 36 stops touching the selfie button 40. For example, the 360-degree camera accessory 30 may remain in a selfie view while the user 36 is touching the selfie button 40 or for a period of time after the user 36 initially tapped the selfie button 40 or a period of time after the tap was completed. In some embodiments, the user may need to tap the selfie button 40 a second time to return the 360-degree camera accessory 30 to the last view before entering the selfie view. In some embodiments, the 360-degree camera accessory 30 may return to a preset view other than the last view. The preset view may be set by a user or determined dynamically such as 30 seconds before the 360-degree camera accessory entered the selfie view.

Figure 7:
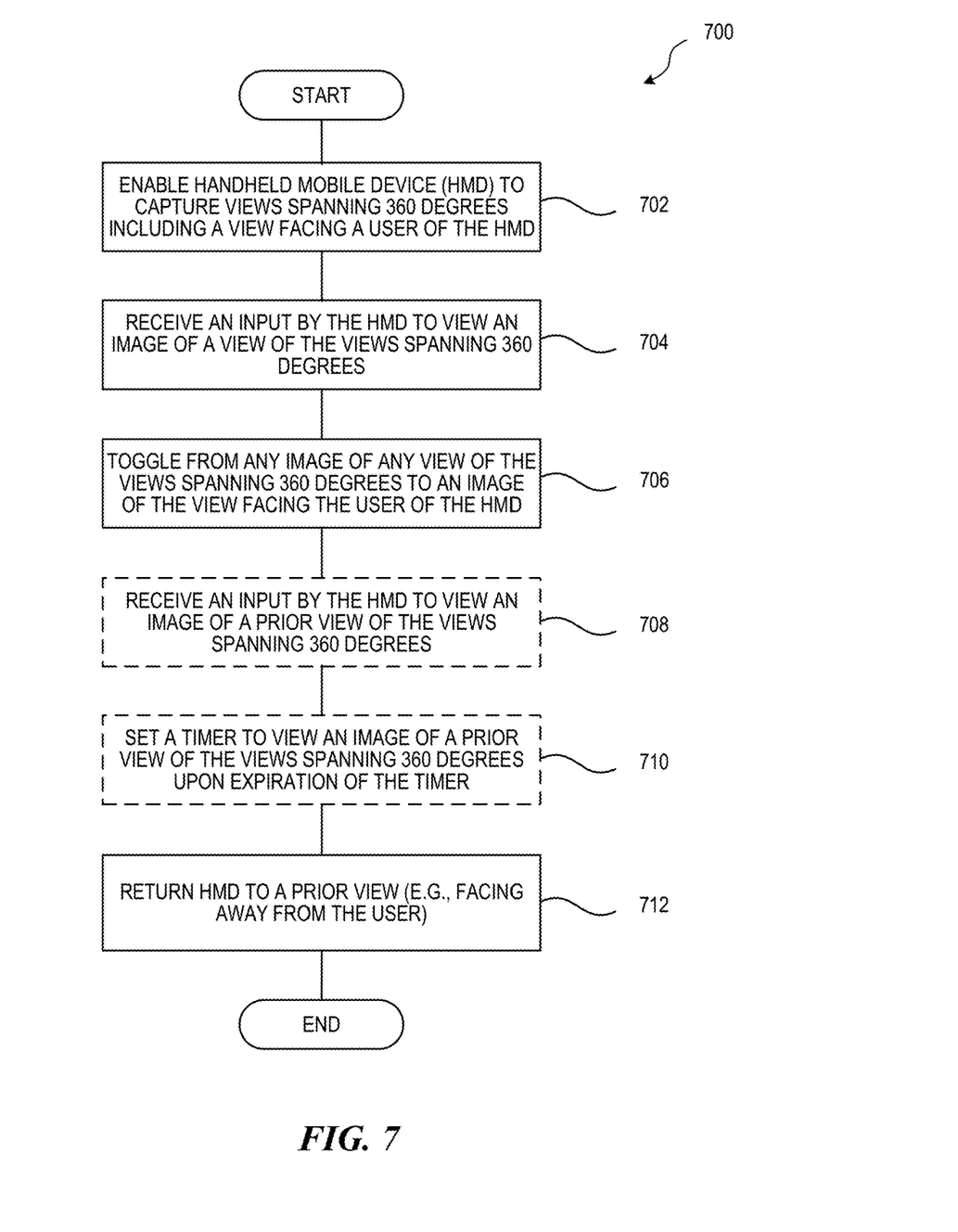
FIG. 7 is a flowchart illustrating a method for toggling a 360-degree camera accessory to a default view according to some embodiments of the present disclosure.

FIG. 7 is a flowchart illustrating a method for toggling a 360-degree camera to a user view (i.e., selfie view) according to some embodiments of the present disclosure. The method 700 is performed by an HMD or combination of HMDs. In some embodiments, the HMD is a 360-degree camera accessory coupled to a smartphone, collectively forming an image capture system. The HMD can include camera modules (e.g., including sensors) collectively enabled to capture any views spanning 360-degrees including a view facing a user of the HMD.

In step 702, the HMD is enabled to capture a 360-degree image and any view spanning 360-degrees including a view facing a user of the HMD. For example, a software application ('app') can execute on the smartphone with the mounted 360-degree camera accessory. The app can control the current view of the 360-degree camera. For example, the app can administer a GUI that includes controls used to pan the 360-degree camera view and capture an image of a current view (e.g., the full 360-degree view or a portion thereof).

In step 704, the HMD receives an input to view an image of any of the views spanning 360-degrees. In step 706, responsive to another input, the HMD is toggled from any image of the views spanning 360-degrees to an image of the view facing the user of the HMD. In some embodiments, the HMD is configured to capture video images continuously when capturing the views spanning the 360-degrees including the view facing the user. In some embodiments, the view facing the user is identified via facial recognition as a view including the user's face.

The HMD can then return to a prior view after entering the user view and/or after capturing the user view. For example, in optional step 708, the HMD receives another input to return to a prior view of the HMD. In some embodiments, the inputs are all user inputs to the smartphone. In some embodiments, each input is a touch input on a single graphical icon displayed on a touch-sensitive display of the smartphone. In some embodiments, each input is received by a single physical button of the smartphone.

In alternative optional step 710, a timer is set for returning to a view facing away from the user upon expiration of the timer. For example, the method 700 can include starting a timer upon toggling to the view facing the user, and return the HMD to a view facing away from the user upon expiration of the timer. In some embodiments, the method 700 can further include detecting an event causing the HMD to return to a view facing away from the user. The event may be associated with capturing a preset number of images or capturing images of user views for a preset duration. For example, the HMD may enter a selfie mode to capture a short video or sequence of still images of the user and immediately return to the last view before entering the selfie mode.

In step 712, the view of the HMD is returned to a view facing away from the user. In some embodiments, the return view was set to a last view before the HMD was toggled to the view facing the user. In some embodiments, the return view was set to a view preset before the HMD was toggled to the view facing the user. In some embodiments, the HMD is configured to capture a video while capturing the views spanning the 360-degrees including the view facing the user.

Embodiments can include an image capture system including a combination of a smartphone and a camera accessory. The smartphone can include a touch-sensitive display screen and an interface configured to wirelessly couple the smartphone to the accessory while mounted to the smartphone. The camera accessory can include camera modules collectively enabled to capture views spanning 360-degrees including a view facing the user of the HMD and can perform the steps of method 700.

Figure 8:
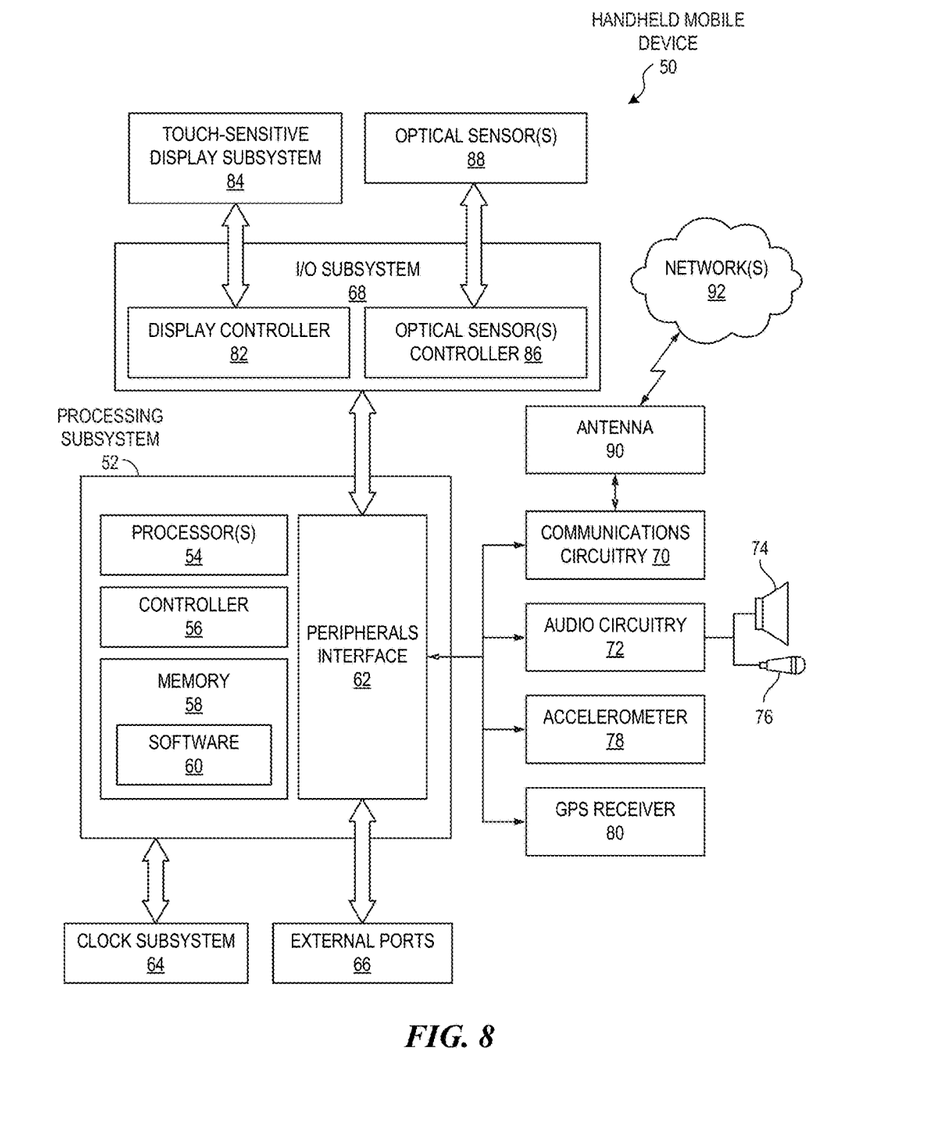
FIG. 8 is a block diagram illustrating an example handheld mobile device in which aspects of the disclosed technology can be embodied.

FIG. 8 is a block diagram illustrating an example HMD in which aspects of the disclosed technology can be embodied. The HMD 50 may include generic components and/or components specifically designed to carry out the disclosed features. The HMD 50 may be a standalone device (e.g., smartphone 10) or an accessory (e.g., camera accessory 30) of a system. For example, components of the HMD 50 may be included in or coupled to a system-on-chip (SOC), a single-board computer (SBC) system, a desktop or laptop computer, a kiosk, a mainframe, a mesh of computer systems, or combinations thereof.

In some embodiments, the HMD 50 can operate as a server device or a client device in a client-server network environment, or as a peer machine in a peer-to-peer system. In some embodiments, the HMD 50 may perform one or more steps of the disclosed embodiments in real-time, near real-time, offline, by batch processing, or combinations thereof.

The HMD 50 includes a processing subsystem 52 that includes one or more processors 54 (e.g., central processing units (CPUs), application specific integrated circuits (ASICs), and/or field programmable gate arrays (FPGAs)), a memory controller 56, memory 58 that can store software 60, and a peripherals interface 62. The memory 58 may include volatile memory (e.g., random-access memory (RAM)) and/or non-volatile memory (e.g., read-only memory (ROM)). The memory 58 can be local, remote, or distributed. The HMD 50 can also include a clock subsystem 64 that controls a timer for use in some embodiments. The components of the HMD 50 are interconnected over a bus (not shown) operable to transfer data between hardware components.

The peripherals interface 62 is coupled to one or more external ports 66, which can connect to an external power source, for example. The peripherals interface 62 is also coupled to an I/O subsystem 68. Other components coupled to the peripherals interface 62 include communications circuitry 70, audio circuitry 72 for a speaker 74 and a microphone 76, an accelerometer 78, a GPS receiver 80 (or global navigation satellite System (GLONASS) or other global navigation system receiver), and other sensors (not shown). The GPS receiver 80 is operable to receive signals concerning the geographic location of the HMD 50. The accelerometer 78 can be operable to obtain information concerning the orientation (e.g., portrait or landscape) of the HMD 50.

The I/O subsystem 68 includes a display controller 82 operative to control a touch-sensitive display system 84, which further includes the touch-sensitive display of the HMD 50. The I/O subsystem 68 also includes optical sensor(s) controller 86 for one or more optical sensors 88 of the HMD 50. The I/O subsystem 68 includes other components to control physical buttons such as a "home" button (e.g., button 14).

The communications circuitry 70 can configure or reconfigure the antenna 90 of the HMD 50. In some embodiments, the antenna 90 can be structurally integrated with the HMD 50 (e.g., embedded in the housing or display screen) or coupled to the HMD 50 through the external ports 66. The communications circuitry 70 can convert electrical signals to/from electromagnetic signals that are communicated by the antenna 90 to network(s) 92 or other devices. For example, the communications circuitry 70 can include radio frequency (RF) circuitry that processes RF signals communicated by the antenna 90.

The communications circuitry 70 can include circuitry for performing well-known functions such as an RF transceiver, one or more amplifiers, a tuner, oscillators, a digital signal processor, a CODEC chipset, a subscriber identity module (SIM card or eSIM), and so forth. The communications circuitry 70 may communicate wirelessly via the antenna 90 with the network(s) 92 (e.g., the Internet, an intranet and/or a wireless network, such as a cellular network, a wireless local area network (LAN) and/or a metropolitan area network (MAN)) or other devices.

The software 60 can include an operating system (OS) software program, application software programs, and/or modules such as a communications module, a GPS module, and the like. For example, the GPS module can estimate the location of the HMD 50 based on the GPS signals received by the GPS receiver 80. The GPS module can provide this information to components of the HMD 50 for use in various applications (e.g., to provide location-based services).

A software program, when referred to as "implemented in a computer-readable storage medium," includes computer-readable instructions stored in the memory (e.g., memory 58). A processor (e.g., processor 54) is "configured to execute a software program" when at least one value associated with the software program is stored in a register that is readable by the processor. In some embodiments, routines executed to implement the disclosed embodiments may be implemented as part of OS software (e.g., MICROSOFT WINDOWS and LINUX) or a specific software application, component, program, object, module, or sequence of instructions referred to as "computer programs."

Computer programs typically comprise one or more instructions set at various times in various memory devices of a computing device (e.g., HMD 50), which, when read and executed by at least one processor (e.g., processor 54), will cause the HMD 50 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 58).

Operation of a memory device (e.g., memory 58), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The HMD 50 may include other components that are not shown nor further discussed herein for the sake of brevity.

One having ordinary skill in the art will understand any hardware and software that is included but not shown in FIG. 8. While embodiments have been described in the context of fully functioning handheld devices, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method performed by a handheld mobile device, the method comprising:
   enabling the handheld mobile device to render a plurality of field of views spanning 360-degrees including a reference view, which is a field of view facing a user;
   receiving, by the handheld mobile device, a first input to render a field of view facing away from the user;
   responsive to the first input, causing the handheld mobile device to render the field of view facing away from the user;
   receiving, by the handheld mobile device, a second input to toggle the handheld mobile device to the reference view;
   responsive to the second input:
      (a) setting a return view of the handheld mobile device to the field of view facing away from the user; and
      (b) causing the handheld mobile device to render the reference view;
   receiving, by the handheld mobile device, a third input to toggle the handheld mobile device back to the return view; and
   responsive to the third input, causing the handheld mobile device to render the return view.

2. The method of claim 1, wherein the handheld mobile device is a camera accessory coupled to a smartphone.

3. The method of claim 2, wherein the smartphone is configured to selectably display each of the plurality of field of views spanning 360-degrees.

4. The method of claim 2, wherein each input is an input by the user to the smartphone.

5. The method of claim 4, wherein each input is a touch input on a single graphical icon displayed on a touch-sensitive display screen of the smartphone.

6. The method of claim 4, wherein each input is received by a single physical button of the smartphone.

7. An image capture system comprising:
   (i) a smartphone including:
      a processor;
      a touch-sensitive display screen; and
      an interface configured to wirelessly couple the smartphone to an accessory while mounted to the smartphone; and
   (ii) a camera accessory coupled to the interface, the camera accessory including:
      a plurality of camera modules enabled to capture a plurality of field of views spanning 360-degrees including a reference view, which is a field of view including a user of the smartphone;
   wherein the processor is configured to:
      responsive to an input by the user on the smartphone, cause the system to toggle from displaying on the display screen any of the plurality of field of views spanning 360-degrees to displaying a reference view on the display screen; and
      responsive to another input by the user on the smartphone, cause the system to switch from displaying the reference view on the display screen to displaying a return view on the display screen, the return view being a field of view displayed before the system was toggled to display the reference view on the display screen.

8. The system of claim 7, wherein the return view is a field of view displayed immediately before the handheld mobile device was toggled to display the reference view.

9. The system of claim 7, wherein the return view is a field of view pre-selected before the handheld mobile device was toggled to the reference view.

10. The system of claim 7, wherein the another input comprises an event associated with capturing a preset number of images of the user or capturing images of the user for a preset duration.

11. The system of claim 7, wherein the another input comprises an expiration of a timer that started when the system was toggled to the reference view.

12. The system of claim 7, wherein each input is a touch input on a single graphical icon displayed on the touch-sensitive display screen of the smartphone.

13. The system of claim 7, wherein each input is received by a single physical button of the smartphone.

14. The system of claim 7, wherein the system is configured to capture a video spanning 360 degrees.

15. The system of claim 7, wherein the reference view is identified via facial recognition of the user's face.

16. The system of claim 7, wherein the touch-sensitive display screen is configured to selectably display each of the plurality of field of views spanning 360-degrees.

17. A method performed by an image capture system including a plurality of camera sensors configured to capture a 360-degree image, the method comprising:
   using the plurality of camera sensors to capture a 360-degree image; and
   selectably toggling between displaying any of a plurality of portions of the 360-degree image and a pre-selected portion of the 360-degree image.

18. The method of claim 17, wherein the toggling is performed via a touch input on a touch-sensitive display screen of the system.

19. The method of claim 17, wherein the toggling is performed via a physical button of the system.

20. The system of claim 17, wherein the plurality of camera sensors is configured to capture a 360-degree video, the method further comprising:
   selectably toggling between displaying any of a plurality of portions of the 360-degree video and a pre-selected portion of the 360-degree video.

* * * * *